Dec. 7, 1965  H. A. BING ET AL  3,221,627
PHOTOGRAPHIC RANGE AND VIEWFINDER
Filed March 29, 1963  4 Sheets-Sheet 1
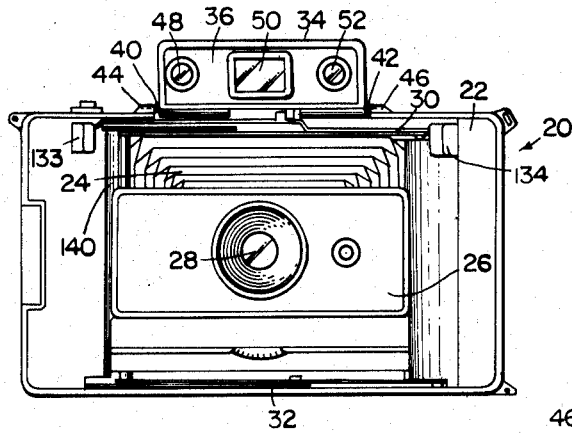
FIG.1
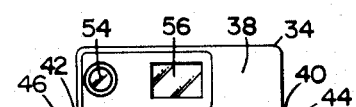
FIG.2
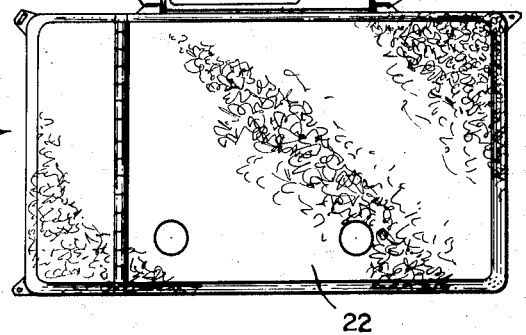
FIG.3
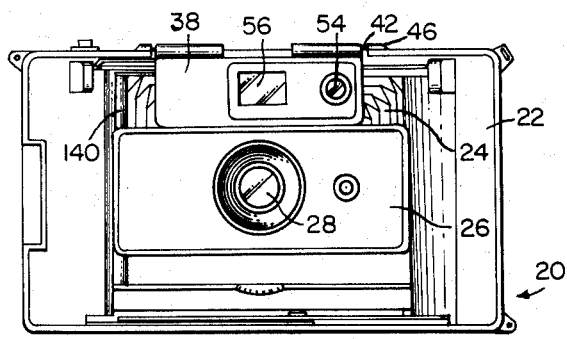
FIG.4
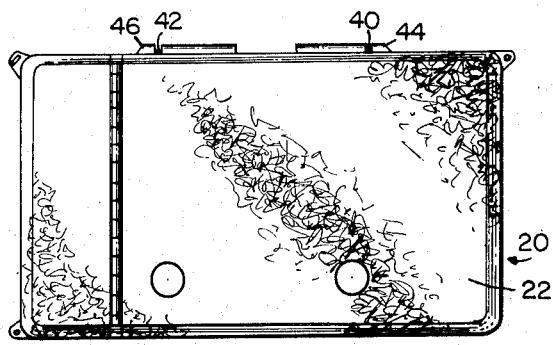
INVENTORS
Herbert A. Bing
Robert A. Malecki
BY Brown and Mikulka
ATTORNEYS Dec. 7, 1965    H. A. BING ET AL    3,221,627
PHOTOGRAPHIC RANGE AND VIEWFINDER
Filed March 29, 1963    4 Sheets-Sheet 2

INVENTORS
Herbert A. Bing
and
Robert A. Malerbi
BY
Brown and Mikulka
ATTORNEYS

Dec. 7, 1965   H. A. BING ET AL   3,221,627

PHOTOGRAPHIC RANGE AND VIEWFINDER

Filed March 29, 1963   4 Sheets-Sheet 3

INVENTORS
Herbert A. Bing
Robert A. Malarki
BY
Brown and Mikulka
ATTORNEYS

Dec. 7, 1965   H. A. BING ET AL   3,221,627
PHOTOGRAPHIC RANGE AND VIEWFINDER
Filed March 29, 1963   4 Sheets-Sheet 4
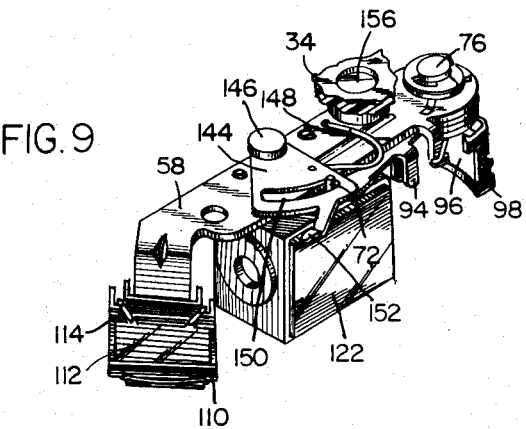
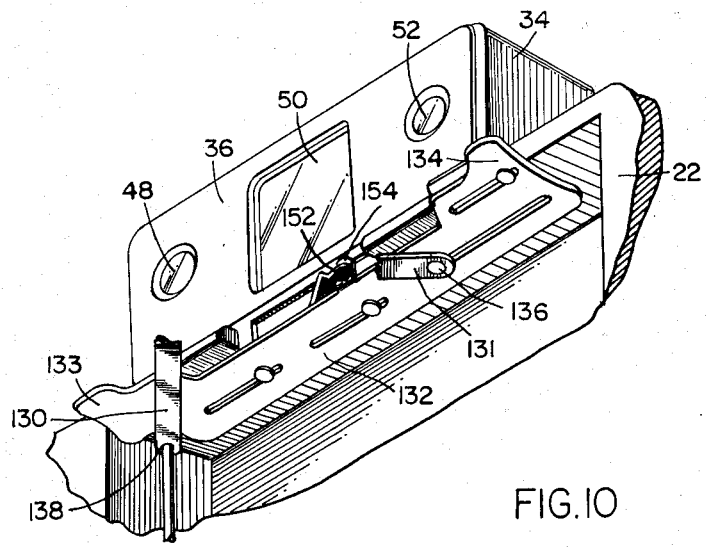
INVENTORS
Herbert A. Bing
Robert A. Malerbi
BY
Brown and Mikulka
ATTORNEYS

United States Patent Office 3,221,627
Patented Dec. 7, 1965

3,221,627
PHOTOGRAPHIC RANGE AND VIEWFINDER
Herbert A. Bing, Wellesley, and Robert A. Malerbi, Brighton, Mass., assignors to Polaroid Corporation, Cambridge, Mass., a corporation of Delaware
Filed Mar. 29, 1963, Ser. No. 268,884
7 Claims. (Cl. 95—44)

This invention relates to optical devices such as range and viewfinders for use in conjunction with photographic cameras.

In cameras wherein means are provided for effecting focusing movement of the objective lens, it is a common practice to provide rangefinding means which give the operator a visual indication of when the objective lens is properly focused at a desired plane. Such rangefinder means commonly include optical elements which receive a measuring beam of light from the plane whereon it is desired to focus the objective lens. As the lens is focused by movement thereof relative to the film plane of the camera, this movement is transmitted to the optical elements, thereby varying the deflection of the measuring beam.

It is also known to provide means for moving elements of a camera viewfinder system as the camera objective lens is focused to correct for parallax errors. The viewfinder is arranged on the camera to indicate to the operator the boundaries of the scene which will be recorded on the film upon making an exposure. In "view" cameras and some reflux cameras this may be done by viewing the scene to be photographed directly through the objective lens. In other cameras, however, it is necessary to provide viewing means at some other point on the camera. Since the optical axes of the objective lens and the viewfinder system are necessarly displaced from one another by such an arrangement, the boundaries defined by the viewfinder to the eye of the operator will coincide with those defined by the objective lens at the film plane of the camera at only one particular distance from the camera. Means may be provided for shifting the optical axis of the viewfinder system in response to focusing movement of the objective lens so that the boundaries defined by the viewfinder coincide with those defined by the lens at the plane which is in focus by the lens at each focus position thereof. This compensates for the parallax due to viewing the scene from two laterally displaced positions.

Since the optical elements of rangefinders and viewfinders which move in response to focusing movement of the camera objective must be properly aligned and calibrated with respect to the optical axis and focusing means of the camera, it is the usual practice to mount such elements within a housing which is rigidly affixed to the camera body. With the mounting members held stationary with respect to the camera, the optical elements could be expected to remain oriented properly, at least more so than if the members were movable between a plurality of positions.

The present invention is concerned with a unitary, combined rangefinder and viewfinder for use with a photographic camera and including means for shifting the optical axis of the viewfinder to correct for parallax. The elements of the range and viewfinder are contained within a housing which is movable with respect to the camera body and the optical axis of the objective lens. In the interest of providing a more compact camera, the housing may be moved to a folded position when not in use, whereby it does not extend from one side of the camera, as when it is erected in the operative position.

It is a principal object of the present invention to provide a combined range and viewfinder including optical elements operable in cooperation with focusing movement of the camera objective lens and mounted for movement between operative and inoperative position with respect to the camera body.

A further object is to provide novel coupling means for transmitting focusing movement of a camera objective lens to the optical elements of a device such as a rangefinder or a viewfinder which operates in conjunction with the lens.

Another object is to provide novel means for transmitting motion from a member which is reciprocably movable in a direction transverse to the optical axis of a camera to effect focusing movement of the objective lens thereof to a movable element for deflecting a measuring beam in a rangefinder system and for shifting the optical axis of a viewfinder system to correct for parallax.

A still further object is to provide a single cam surface and follower, movable in response to focusing movement of a camera objective lens, for simultaneously and cooperatively moving optical elements of both a rangefinder and a viewfinder system.

Still another object is to provide a combined range and viewfinder system for use in cooperation with a photographic camera which permits a more compact camera construction.

Other objects of the invention will in part be obvious and will in part appear hereinafter.

The invention accordingly comprises the apparatus possessing the construction, combination of elements and arrangement of parts which are exemplified in the following detailed disclosure, and the scope of the application of which will be indicated in the claims.

For a fuller understanding of the nature and objects of the invention, reference should be had to the following detailed description taken in connection with the accompanying drawings wherein:

FIGURE 1 is a front elevational view of a photographic camera, showing the range and viewfinder of the present invention in the erected or operative position;

FIG. 2 is a rear view of the camera of FIGURE 1;

FIG. 3 is also a front elevational view of the camera of FIGURE 1 with the range and viewfinder in the folded or retracted position;

FIG. 4 is a rear view of the camera as shown in FIG. 3;

FIG. 9 is a lower, front perspective view of a second embodiment of the elements of the range and viewfinder; and FIG. 10 is a fragmentary, lower, front perspective view of selected elements of the camera of FIGS. 1-4, showing the manner of coupling the erecting and focusing system of the camera to the range and viewfinder.

Figure 5:
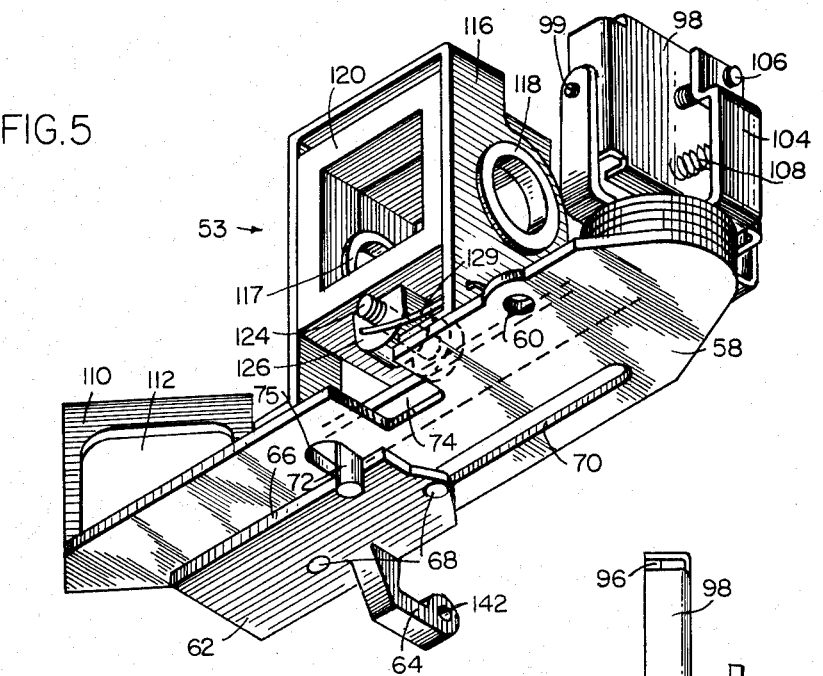
FIG. 5 is a lower rear perspective view of a first embodiment of the elements of the range and viewfinder of the present invention.

Referring now to the drawings, in FIGURES 1-4 is seen a hand-held photographic camera of the folding or collapsible type, which is designated generally by the reference numeral 20. Camera 20 includes the usual camera body 22, expansible and collapsible bellows 24, and shutter housing 26 whereon objective lens 28 is mounted. Shutter housing 26 is movable between extended and retracted positions with respect to body 22 by means of an erecting system which comprises linkages 30 and 32, each including a pair of scissors-type links commonly known as "lazy tongs." When in the extended position, housing 26 may be moved relative to body 12 to effect focusing movement of lens 28 relative to the film plane of camera 20. This may be done by moving the pivotal mountings at one side of each of the linkages in a direction transverse to the optical axis of the camera as defined by objective lens 28. The structure of the erecting system and the manner of effecting focusing movement of the objective lens through movement thereof in the manner described, is disclosed more fully in U.S. application Serial No. 214,560, of Robert S. Borghesani, filed August 3, 1962. A portion of such apparatus is shown in FIG. 10 of the present application and will be discussed more fully hereinafter.

The operative elements of a combined rangefinder and viewfinder system used in conjunction with camera 20 are contained within housing 34 having front wall 36, rear wall 38, and the usual top, bottom and side walls. Housing 34 is pivotally mounted upon hinge pins 40 and 42 which extend into hollow portions 44 and 46 respectively on camera body 22. Housing 34 is adapted to be moved about its pivotal mounting between an operative or erected position and an inoperative or folded position with respect to camera body 22. Housing 34 is shown in the erected position as seen from the front of the camera in FIGURE 1 and from the back of the camera in FIG. 2. Housing 34 is shown in the folded position as seen from the front of the camera in FIG. 3 and from the rear of the camera in FIG. 4. Housing 34 is releasably retained in the erected position by appropriate latch means which are not shown in the present application. A preferred embodiment of such means may be found in copending application Serial No. 268,998 of Richard Wareham, filed of even date herewith. In FIGURE 1 it may be seen that front wall 36 contains three openings or windows 48, 50, 52. In FIGS. 2 and 3 it may be seen that rear wall 38 contains two openings or windows 54 and 56.

Referring now to FIGS. 5 through 8, there is seen a first embodiment of optical elements and mechanical means for mounting and effecting movement thereof, forming a rangefinder and viewfinder system for use in conjunction with camera 20. The elements shown in FIGS. 5-8, referred to collectively as finder unit 53, are adapted to be mounted within housing 34. Base support 58 is adapted to be mounted upon housing 34, for example by a screw which extends through opening 60 in base support 58 to engage a wall of housing 34. Mounted upon base support 58 for reciprocal sliding movement with respect thereto is cam element 62, which includes extending arm 64 and cam surface 66. Element 62 may be mounted upon base support 58 by pins 68 which extend fixedly from element 62 through elongated slot 70 in base support 58. Arm 64 is connected to a movable element of the focusing system for objective lens 28 for movement therewith as will be explained later in more detail.

Cam follower pin 72 extends from follower arm 74 through opening 75 in base support 58 to engage cam surface 66. Follower arm 74 is pivotally mounted at the end remote from pin 72 upon base support 58 by means such as pivot 76. Pin 72 is urged into contact with cam surface 66 by the biasing force exerted by spring 78 upon follower arm 74. Also mounted for pivotal movement on pivot 76, independently of follower arm 74 is first holding bracket 80 which includes extending base portion 82. First adjusting screw 84 extends through a threaded hole in upstanding tab 86 on base portion 82 of first holding bracket 80. Spring 88 is engaged at one end in fixed pin 90 on base portion 82, and at the other end to fixed pin 92 on base support 58. First holding bracket 80 is therefore biased by spring 88 for rotation about pivot 76 in a clockwise direction as seen, for example, in FIG. 6. One end of adjusting screw 84 is thereby urged into contact with ear portion 94 on follower arm 74.

Figure 6:
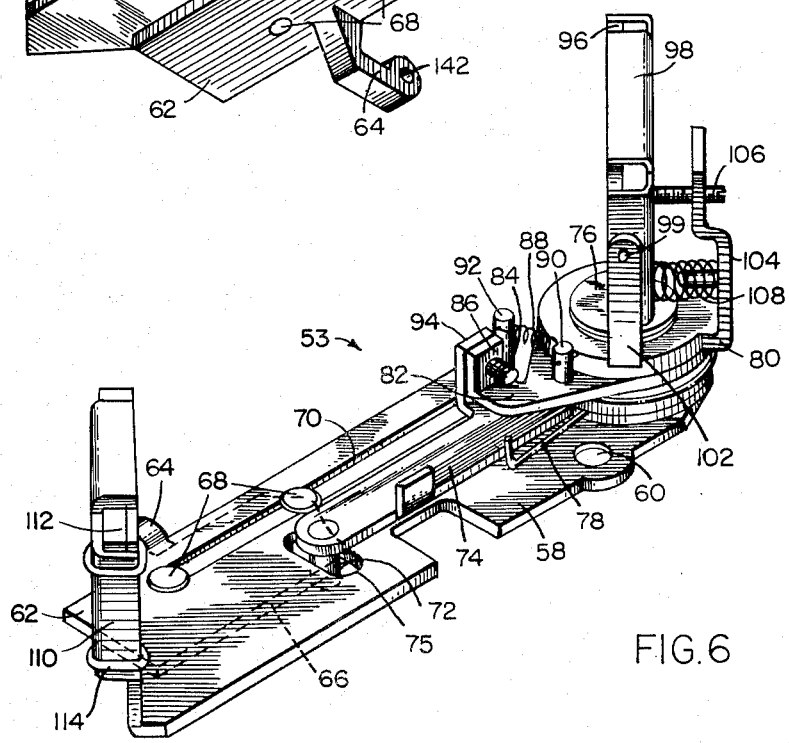
FIG. 6 is an upper, rear perspective view of the elements of FIG. 5, with the viewfiinder portion removed to show more clearly the other elements.

Rotatable mirror 96 is held by holder 98 which is rotatably mounted at the center of two opposite sides by pins 99 and 100 upon U-shaped bracket 102 which forms a portion of first holding bracket 80. Holding bracket 80 includes upstanding portion 104 through which extends second adjusting screw 106. Coil spring 108 is mounted between upstanding portion 104 and holder 98 to engage the holder at a point thereon below pivotal axis thereof. Spring 108 is in compression, and therefore urges rotation of holder 98 in a counterclockwise direction as seen in FIG. 6. Holder 98 is constrained in this position by contact with second adjusting screw 106, which engages the holder at a point above the pivotal axis thereof.

Second holding bracket 110 comprises an upstanding portion of, or is fixedly attached to, base support 58. Fixed mirror 112 is held in fixed relation to second holding bracket 110 by means such as pressure spring 114. Fixed mirror 112 is disposed between windows 52 and 54 of housing 34 at substantially 45° to the optical axis of the camera, and comprises a dichroic or half-silvered mirror which will both reflect and transmit light. Rotatable mirror 96 is disposed behind window 48 of housing 34 to receive therethrough a measuring beam of light. This measuring beam will be reflected from rotatable mirror 96 to fixed mirror 112 and thence through window 54 to the eye of the operator. A direct beam will also be received through windows 52 and 54, passing through fixed mirror 112.

Figure 7:
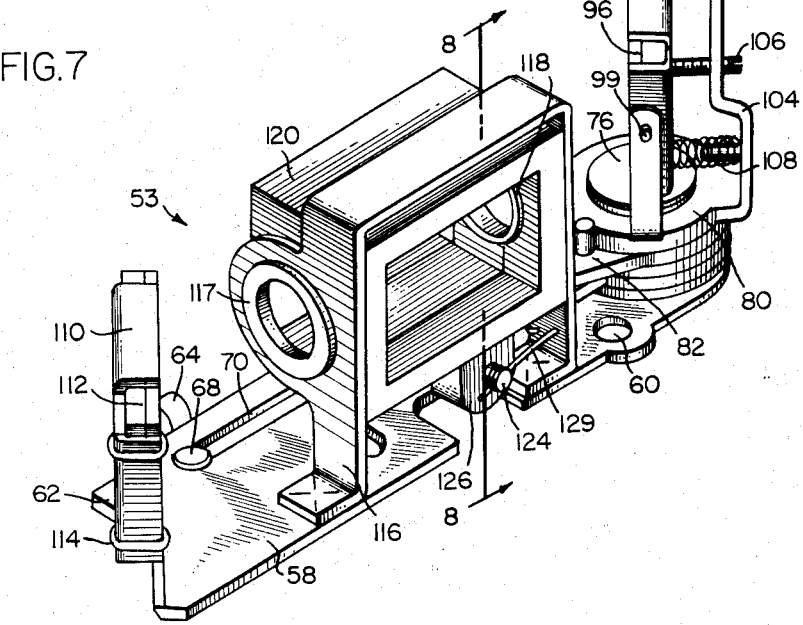
FIG. 7 is an upper, rear perspective view, as in FIG. 6, with the viewfinder portion in position.
Figure 8:
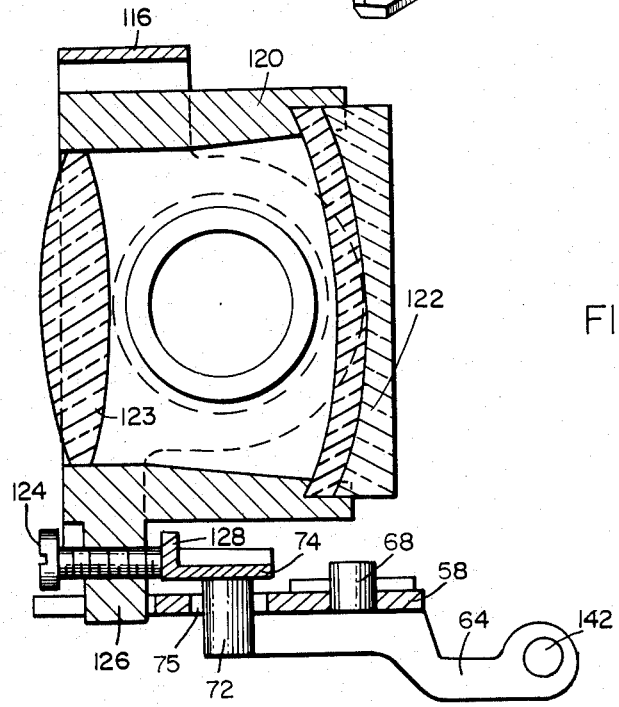
FIG. 8 is a side elevational view in vertical section on the line 8—8 of FIG. 7.

Third mounting bracket 116 is fixedly attached to base support 58 in the position shown in FIG. 7. Openings are provided in each side of mounting bracket 116 and through these openings extend hubs 117 and 118 on viewfinder block 120. Hubs 117 and 118 also are open at their centers to permit the passage of the measuring beam from rotatable mirror 96 to fixed mirror 112. Viewfinder block 120 is thus mounted for rotatable movement upon mounting bracket 116 about an axis through the center of hubs 117 and 118. Viewfinder objective lens 122 and ocular 123 are fixedly held by block 120 as indicated in FIG. 8. Third adjusting screw 124 extends through depending tab 126 on block 120 to engage ear 128 on follower arm 74. Block 120 is biased toward rotation about its pivotal mounting in a counterclockwise direction as seen in FIG. 8 by spring 129, thus maintaining the end of adjusting screw 124 against ear 128. Viewfinder objective lens 122 and ocular 123 are disposed between windows 50 and 56 of housing 34. The operator may thereby view the scene to be photographed through rear window 56, and appropriate framing means are provided for defining the boundaries of such scene which will be recorded on the film upon the operation of the camera shutter. Such framing means may be provided, for example, in the form of a fixed rectangular frame imprinted on or otherwise affixed to ocular 123.

In FIG. 10 is shown a fragment of camera body 22 and links 130 and 131 which form at least a portion of linkage 30. Focusing slide 132 is mounted for reciprocal sliding movement relative to camera body 22 and may be so moved by manual engagment of opposite end portions 133 and 134 thereof. When in the position of FIG. 10, pivotal mounting 136 of link 131 is fixed with respect to focusing slide 132 and pivotal mounting 138 of link 130 is fixed with respect to camera body 22. The two links are pivotally connected at a point intermediate the two ends of at least one of the links, and shutter housing 26 is operatively connected to the other end of this link, as by rod 140, which may be seen in FIGS. 1 and 3. Thus, movement of focusing slide 132 in either direction will move pivotal mounting 136 of link 131 relative to camera body 122, while pivotal mounting 138 of link 130 remains fixed with respect to the camera body. This movement of focusing slide 132 in a direction transverse to the optical axis of the camera will cause movement of objective lens 28 relative to the film plane of the camera. This manner of effecting focusing movement of the objective lens, as well as the elements of apparatus associated therewith, may be found in the previous mentioned U.S. application Serial No. 214,560.

As pointed out hereinbefore, arm 64 of cam element 62 is connected to focusing slide 132 for movement therewith. The connection may be in the form of a fixed pin which extends through opening 142 in arm 64 and through a like opening in a suitably positioned arm on focusing slide 132. The longitudinal axis of this pin is coincident with the axis of hinge pins 40 and 42 so that the axis about which housing 34 is rotated in moving between the erected and folded positions extends through the fixed connection between arms 64 and focusing slide 132. As cam element 62 is moved, follower arm 74 is rotated about its mounting upon pivot 76 by virtue of the engagement of follower pin 72 with cam surface 66. Rotation of follower arm 74 produces a like rotation of mounting bracket 80, and thus of rotatable mirror 96, about pivot 76 due to the contact of first adjusting screw 84 with ear 94. The measuring beam reflected by rotatable mirror 96 is thus shifted relative to fixed mirror 112, whereby the measuring beam may be brought into coincidence with the direct beam received through window 52 and passing through fixed mirror 112.

The rotation of follower arm 74 in response to movement of cam element 62 also causes rotation of viewfinder block 120 about its pivotal mounting. This is due to the contact of third adjusting screw 124 with ear 128 on follower arm 74 and serves to shift the optical axis of the viewfinder accordingly. The viewfinder is mounted directly to one side of objective lens 28, as may be seen in FIGURE 1 so that there will be a parallax difference in one plane only. That is, rotation of block 120 to shift the optical axis of the viewfinder in one direction only will correct for the parallax due to viewing the scene through the viewfinder from a position laterally displaced from the optical axis of the camera.

In FIG. 9 is seen a bottom perspective view of a second embodiment of the invention. In this embodiment, wherein like reference numerals are used to denote elements which are common to both illustrated embodiments, cam element 144 is pivotally mounted by means of pin 146 upon base support 58. Cam element 144 is biased by spring 148 for movement in a clockwise direction, as seen in FIG. 9, about pivotal mounting 146. Follower pin 72 extends through cam slot 150 in cam element 144. Arm 152 is maintained, by the bias of spring 148, in contact with a face of extending tab 154 on focusing slide 132 as seen in FIG. 10. Thus, movement of focusing slide 132 will be transmitted to extending arm 152 of cam element 144, and through cam slot 150 to follower pin 72. This produces rotation of follower arm 74, with resulting movement of rotatable mirror 96 and viewfinder block 120, as in the previous embodiment. It is to be noted that there is no fixed connection between the cam element and the focusing slide in the embodiment of FIG. 9. Thus, it is not necessary to make the end of arm 152 coincident with the pivotal axis of housing 34. Arm 152 will be maintained in contact with tab 154 on the focusing slide even while housing 34 is moved between the erected and folded positions and the end of the arm may ride on the surface of the tab if it is not coincident with the pivotal axis. Also, the spring bias on follower arm 74 is not required in this embodiment since pin 72 thereon is constrained in cam slot 150 and cam element 144 is biased by spring 148.

Also seen in FIG. 9 is a fragment of housing 34 to which base support 58 is connected by means of screw 156. Base support 58 is thus mounted in a cantilever manner upon housing 34. When the unit is initially assembled, finder unit 53 may be placed within housing 34 before rear wall 38 is placed thereon. Base support 58 may then be rotated until the unit is properly aligned with the film plane and optical axis of the camera 20, and screw 156 then tightened to lock the position of base support 58 to housing 34. The optical elements of the unit may then be properly aligned with respect to camera body 22 by means of adjusting screws 84 and 106, in the case of rotatable mirror 96, and by adjusting screw 124, in the case of viewfinder block 120. Cam surface 66 (or cam slot 150, in the second embodiment) may be so designed, by means well known in the art, to impart such motion to the optical elements of the finder unit that the desired relationship between this movement and focusing movement of objective lens 28 is maintained. That is, with housing 34 in the erected position, when the operator looks through window 54 the images received from the direct beam and the measuring beam will be in coincidence at the plane which is focused by objective lens 28 at the film plane of camera 20. When the operator looks through window 56 the boundaries defined by the frame on viewfinder ocular 123 will correspond to the boundaries of the scene which will be recorded on the film, upon operation of the shutter, at the plane which is focused by objective lens 28 at the film plane. The movement which is imparted to the rotatable mirror to effect ranging, as well as the movement imparted to the viewfinder to shift the optical axis thereof in correcting for parallax, is transmitted through a single cam and follower arrangement. The operative connection between the movable cam element and the focusing system for the camera objective lens permits a pivotal mounting of the housing containing the optical elements of the finder unit upon the camera body without sacrificing the accuracy of the device.

Since certain changes may be made in the above apparatus without departing from the scope of the invention herein involved, it is extended that all matter contained in the above description or shown in the accompanying drawings shall be interpreted as illustrative and not in a limiting sense.

What is claimed is:

1. In a photographic camera having a camera body, an objective lens and movable means for effecting focusing movement of said lens relative to the film plane of said camera, the combination comprising:
    (a) a rangefinder having means for receiving and deflecting a measuring beam from the scene to be photographed;
    (b) a housing wherein the elements of said rangefinder are enclosed;
    (c) mounting means for movably affixing said housing to said camera body for selective movement between an operative position, wherein said scene may be viewed through said rangefinder, and an inoperative position, wherein said housing is at least partially enclosed within said camera body; and
    (d) linkage means effective upon movement of said housing to said operative position to transmit movement of said movable means to said receiving and deflecting means, whereby said measuring beam provides a visual indication of the plane of the scene which is focused at the film plane of said camera by said objective lens throughout the focusing range thereof.

2. The invention according to claim 1 wherein said housing is mounted upon said camera body for pivotal movement relative thereto about a fixed axis.

3. The invention according to claim 2 wherein said linkage means comprise a portion of said movable means for effecting focusing movement, a movable member associated with said rangefinder and biasing means urging the two into engagement when said housing is in said operative position, whereby said movable member is moved in response to movement of said portion of said movable means.

4. In a photographic camera having a camera body, an objective lens and movable means for effecting focusing movement of said lens relative to the film plane of said camera, the combination comprising:
- (a) a viewfinder having an optical axis;
- (b) a housing wherein the elements of said viewfinder are enclosed;
- (c) mounting means for movably affixing said housing to said camera body for selective movement between an operative position, wherein a scene to be photographed may be viewed through said viewfinder, and an inoperative position, wherein said housing is at least partially enclosed within said camera body; and
- (d) linkage means effective upon movement of said housing to said operative position to transmit movement of said movable means to portions of said viewfinder in such a way that said optical axis is shifted in response to said focusing movement to intersect the optical axis of said objective lens substantially at the plane focused thereby at the film plane of said camera.

5. The invention according to claim 4 wherein said housing is mounted upon said camera body for pivotal movement relative thereto about a fixed axis.

6. In a photographic camera having a camera body, an objective lens and movable means for effecting movement of said lens relative to the film plane of said camera, the combination comprising:
- (a) a rangefinder having means for receiving and deflecting a measuring beam from the scene to be photographed;
- (b) a viewfinder having an optical axis;
- (c) a housing wherein elements of said rangefinder and said viewfinder are enclosed, said housing being mounted on said camera body for selective movement between an operative position, wherein said scene may be viewed through said rangefinder and said viewfinder, and an inoperative position, wherein said housing is at least partially enclosed within said camera body;
- (d) a single cam element movable in response to said focusing movement and in predetermined relationship thereto;
- (e) a single follower member movable in response to movement of said cam element;
- (f) means for transmitting movement of said follower member to portions of said viewfinder, whereby said optical axis is shifted in response to said focusing movement to intersect the optical axis of said objective lens substantially at the plane focused thereby at the film plane of said camera; and
- (g) means for transmitting movement of said follower member to said receiving and deflecting means, whereby said measuring beam provides a visual indication of said plane which is focused at the film plane of said camera.

7. The invention according to claim 6 wherein said housing is mounted upon said camera body for pivotal movement relative thereto about a fixed axis.

References Cited by the Examiner

UNITED STATES PATENTS

| | | | |
|---|---|---|---|
| 2,390,932 | 12/1945 | Fitz | 95—11 |
| 2,717,543 | 9/1955 | McCathron | 95—44 |
| 2,737,844 | 3/1956 | Jerome | 95—44 X |
| 2,900,887 | 8/1959 | Nerwin | 95—44 |
| 3,002,439 | 10/1961 | Henning | 95—44 |

JOHN M. HORAN, *Primary Examiner.*

NORTON ANSHER, *Examiner.*